United States Patent [19]

Barrington

[11] 4,374,583

[45] Feb. 22, 1983

[54] SLEEVE VALVE

[75] Inventor: Burchus Q. Barrington, Duncan, Okla.

[73] Assignee: Halliburton Company, Duncan, Okla.

[21] Appl. No.: 225,163

[22] Filed: Jan. 15, 1981

[51] Int. Cl.³ .................. F16K 31/50; F16K 3/36
[52] U.S. Cl. ............................... 251/324; 251/355
[58] Field of Search .......................... 251/324, 355

[56] References Cited

U.S. PATENT DOCUMENTS 2,217,834 10/1940 Corbin, Jr. .................. 251/324 X
2,813,695 11/1957 Stogner ........................... 251/159
3,223,112 12/1965 Ashbrook et al. ............. 251/324 X
3,428,297 2/1969 Volpin ............................ 251/355
4,290,578 9/1981 Earp et al. .................... 251/324 X

FOREIGN PATENT DOCUMENTS 462953 5/1975 U.S.S.R. ........................... 251/324

Primary Examiner—Arnold Rosenthal
Attorney, Agent, or Firm—James R. Duzan

[57] ABSTRACT

An oil filled sliding sleeve type valve comprising a valve body housing, sleeve assembly and actuation assembly.

13 Claims, 1 Drawing Figure

SLEEVE VALVE

BACKGROUND

This invention relates to an improved valve. More specifically, the invention relates to an improved valve for use with cementing heads in well cementing operations.

In well cementing operations where casing is being cemented into a wellbore it is desirable to have a valve to control the flow of cement installed in the flow line from the pumping means to the cementing head installed on the end of the casing being cemented in the wellbore. Typically, in the past, a valve such as described in U.S. Pat. No. 2,813,695 to Stogner has been used to control the flow of cement to the cement head. While such a valve has been proven to be satisfactory, it can be cumbersome to install and actuate.

SUMMARY OF THE INVENTION

In contrast to the prior art, the valve of the present invention is easy to install in a flow line, easy to actuate and easy to clean after use. The valve comprises an oil filled sliding sleeve type valve including a valve body housing, sleeve assembly and actuation assembly.

BRIEF DESCRIPTION OF THE DRAWING

The valve of the present invention will be better understood when taken in conjunction with the following specification and drawings wherein.

DESCRIPTION OF THE INVENTION

Figure 1:
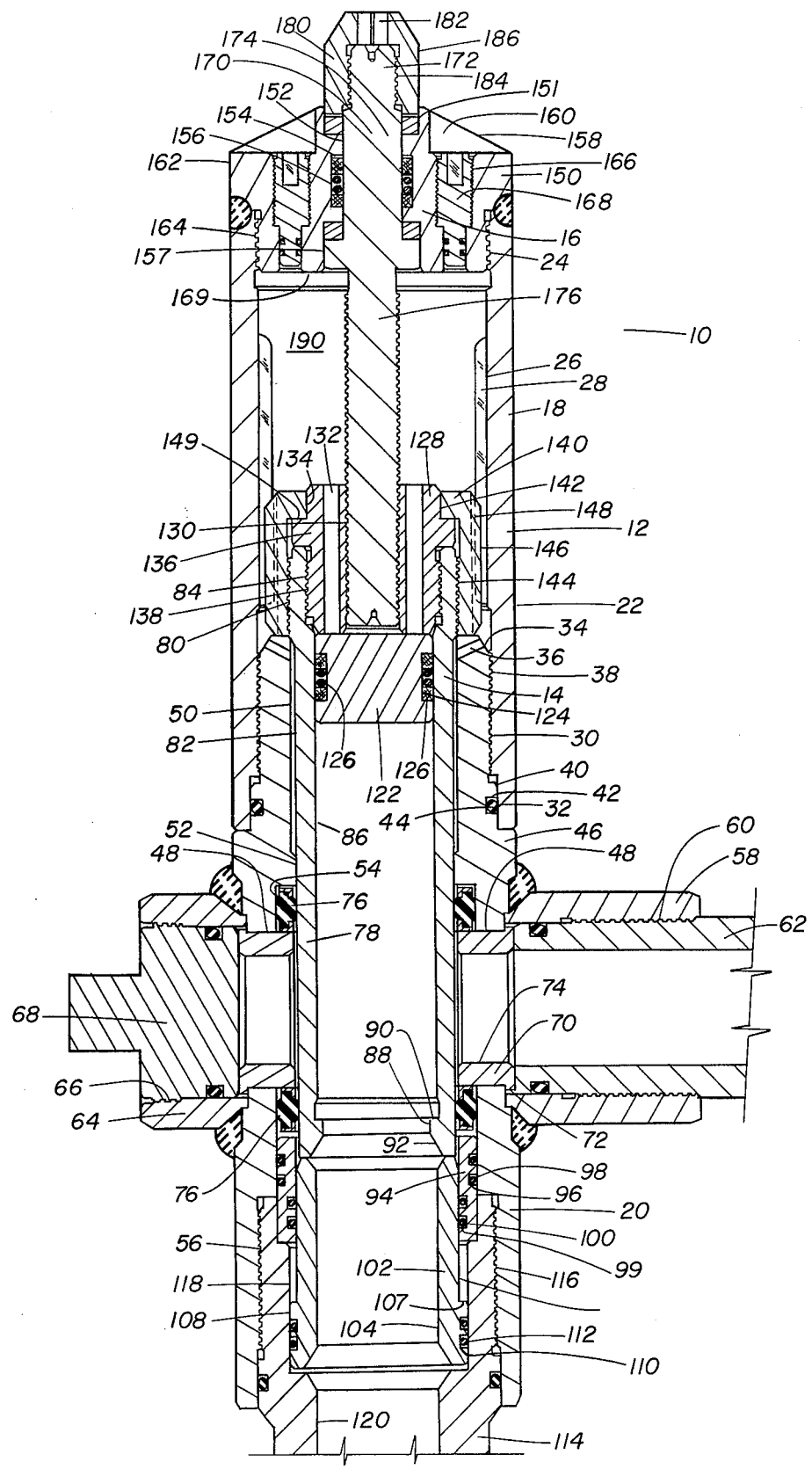
FIG. 1 is a cross-sectional view of the valve of the present invention.

Referring to FIG. 1, the present invention is shown in its preferred embodiment.

The valve 10 comprises valve body housing 12, sleeve assembly 14 and actuation assembly 16.

The valve body housing 12 generally comprises first annular member 18, second annular member 20, and outlet flow line 114.

The first annular member 18 comprises an annular sleeve having a cylindrical outer surface 22, having threaded inlet bore 24 on one end, having first cylindrical bore 26 having, in turn, longitudinal spline members 28 thereon, having threaded bore 30 therein and having second cylindrical bore 32 on one end thereof.

The second annular member 20 comprises an annular sleeve having exterior annular chamfered surface 34 having, in turn, apertures 36 therein, having threaded exterior surface 38 which mates with threaded bore 30 of the first annular member 18, having first cylindrical exterior surface 40 having, in turn, annular seal cavity 42 containing elastomeric seal means 44 therein, which sealingly engages second cylindrical bore 32 on the end of first annular member 18 when second annular member 20 is assembled thereto, having second cylindrical exterior surface 46 having, in turn, apertures 48 therein extending through second annular member 20, having first cylindrical bore 50 in one end portion thereof, having second cylindrical bore 52, having third cylindrical bore 54, and having threaded bore 56 in the other end thereof.

Secured to one aperture 48 in the second annular member 20 is inlet annular sleeve 58 having threaded bore 60 therein which engages inlet flow line 62 which sealingly engages the interior of inlet annular sleeve 58 when installed therein.

Secured to another aperture 48 in second annular member 20 is annular cleanout sleeve 64 having threaded bore 66 therein which threadedly engages suitable plug means 68 when installed therein which plug means 68 also sealingly engages the interior of annular cleanout sleeve 64 when installed therein.

Installed within each aperture 48 in second annular member 20 is annular replaceable seat 70 having a lip 72 on one end thereof and bore 74 therethrough.

Installed on each side of apertures 48 in sealing engagement with third cylindrical bore 54 of the second annular member 20 is annular elastomeric seal means 76.

Installed within second annular member 20 is annular sliding flow sleeve 78. The annular sliding flow sleeve 78 comprises an elongated annular member having threaded exterior end 80, having cylindrical exterior surface 82 which slidingly, sealingly engages annular elastomeric seal means 76, having threaded bore 84 on one end thereof, having first cylindrical bore 86 therein, having second cylindrical bore 88 therein of smaller diameter than first bore 80 thereby forming shoulder 90 and having annular chamfered bore 92 on the other end thereof. The sleeve assembly 14 comprises annular sliding flow sleeve 78, seal sleeve 94, outlet sleeve 102, sliding piston 122, sleeve plug 128 and sleeve cap 140.

Installed within third cylindrical bore 54 of second annular member 20 is seal sleeve 94 having on the exterior thereof annular seal cavities 96 containing elastomeric seal means 98 therein which sealingly engage third bore 54 and having on the interior thereof annular seal cavities 99 containing elastomeric seal means 100 therein.

Installed within seal sleeve 94 is outlet sleeve 102 having bore 104 therethrough, having first cylindrical exterior surface 104 slidingly, sealingly engaging elastomeric seal means 100 in seal sleeve 94, and having second cylindrical exterior surface 108 having, in turn, annular seal cavities 110 having elastomeric seal means 112 therein.

Installed in one end of second annular member 20 is outlet flow line sleeve 114 having exterior threaded portion 116 threadedly engaging threaded bore 56 of second annular member 20, having inlet cylindrical bore 118 which sealingly engages elastomeric seal means 112 and out cylindrical bore 120.

Installed within annular sliding flow sleeve 78 is sliding piston 122 having annular cavity 124 in the exterior thereof which contains elastomeric seal means 126 therein sealingly engaging first cylindrical bore 86 of annular sliding flow sleeve 78.

Secured to one end of annular sliding flow sleeve 78 by means of threaded bore 84 is sleeve plug 128. The sleeve plug 128 comprises a cylindrical plug having threaded bore 130 therethrough, having a plurality of bores 132 surrounding threaded bore 130, having first cylindrical exterior surface 134, having annular exterior rib 136 and having exterior threaded surface 138 threadedly engaging threaded bore 84 of annular sliding flow sleeve 78 such that annular exterior rib 136 abuts the end of sleeve 78 when the sleeve plug 128 is assembled thereto.

Installed on the same end of annular sliding flow sleeve 78 as sleeve plug 128 is sleeve cap 140. The sleeve cap 140 comprising an annular member having first cylindrical bore 142 therein, having threaded bore 144 which threadedly engages threaded exterior end 80 of annular sliding flow sleeve 78 and having cylindrical exterior surface 146 having, in turn, a plurality of longitudinal channels 148 which slidingly receive longitudinal spline members 28 of first annulus member 18 therein. When the sleeve cap 140 is installed on the annular sliding flow sleeve 78 shoulder 149 of cap 140 abuts annular exterior rib 136 of sleeve plug 128.

The actuation assembly 16 comprises valve cap 150, valve actuator rod 170 and rod cap 180.

Secured to one end of first annular member 18 is valve cap 150. The valve cap 150 comprises a cylindrical cap member having first bore 151 therein, having second bore 152 having, in turn, annular cavity 154 containing elastomeric seal means 156 therein, having third bore 157, having exterior annular chamfered surface 158 having, in turn, recesses 160 therein, having cylindrical surface 162, having threaded exterior surface 164 threadedly engaging threaded bore 24 of first annular member 18 and having a plurality of apertures 166 running longitudinally therethrough having, in turn, a plurality of plug means 168 removably, sealingly installed therein.

Installed with valve cap 150 is valve actuator rod 170. The valve actuator rod 170 comprises an elongated member having threaded end portion 172, end portion 174 slidingly, sealingly engaging second bore 152 of valve cap 150, annular rib 176 slidingly engaging third bore 157 of valve cap 150 and having threaded end portion 176 which threadedly engages threaded bore 130 of sleeve plug 126.

Secured to the threaded end 172 of actuation rod 170 is rod cap 180. The rod cap 180 comprises an annular member having a square bore 182 therein, having threaded bore 184 threadedly engaging threaded end 172 of actuation rod 170 and having cylindrical surface 186 which is received within first bore 151 of valve cap 150.

When assembled the interior 190 of the first annular member 180 is filled with suitable oil before the actuation of the valve 10.

OPERATION OF THE VALVE

When it is desired to use the valve 10, the inlet flow line 62 of the valve 10 is connected to the source of fluid to be controlled or regulated while the flow line sleeve 114 is connected to a suitable discharge line for the source of fluid.

The valve 10 is installed having the annular sliding flow sleeve 78 blocking or preventing the flow of fluid through the valve 10. To actuate the valve 10 a suitable tool, such as either a manually operated tool or power tool, is inserted into the square bore 182 of the rod cap 180 and the rod cap 180 rotated. When the rod cap 180 is rotated, the valve actuator rod 170 rotates causing relative movement between sleeve plug 128 and the rod 170 raising the flow sleeve 78 within the valve body housing 12 to allow fluid to flow from the inlet annular sleeve 58 through the flow line sleeve 114. When the annular sliding flow sleeve 78 moves within the valve body housing 12, the outlet sleeve 102 moves within the valve body housing 12 until shoulder 107 on the exterior of the outlet sleeve 102 abuts the end of seal sleeve 94 with the end of seal sleeve 94 being approximately aligned with the edge of annular replaceable seat 70 within aperture 48 but covering seal means 76 to protect the same from any fluids flowing through the valve 10 during use.

As the annular sliding flow sleeve 78 moves within the valve body housing 12 it is prevented from rotational movement by longitudinal spline members 28 of the first annular member 18 slidably mating with longitudinal channels 148 of the sleeve cap 140. Since the chamber 190 of the valve 10 is filled with oil, as the annular sliding flow sleeve 78 moves within the valve body housing 12 to occupy a position within a portion of chamber 190, the oil in the chamber 190 flows through apertures 132 in the sleeve plug 128 to cause the sliding piston 122 in the sleeve 78 to move relative to the sleeve 78 until the piston 122 almost abuts shoulder 90 of the sleeve 78 while the end of sleeve plug 128 abuts end surface 169 of the valve cap 150.

To close the valve 10, the rod cap 180 is merely rotated in an opposite direction to its initial direction of rotation thereby causing the annular sliding flow sleeve 78 to move within the valve body housing 12 until it blocks flow through aperture 48. When this occurs, oil flows through apertures 132 in sleeve plug 128 into chamber 190 until the sliding plug 122 almost abuts the end to sleeve plug 128 due to the pressure differential which acts across sliding plug 122.

When the valve 10 is in its open position with the annular sliding flow sleeve 78 permitting fluid flow from inlet annular sleeve 58 through flow line sleeve 114, the valve 10 may be cleaned by removing plug 68 from aperture 48 and uncontaminated fluid pumped or flowed through the valve 10 out the unplugged aperture 48. Once the valve 10 is cleaned, the plug 68 is reinstalled.

It should be noted that the amount of torque required to actuate the valve 10 is minimized since the oil in chamber 190 acts as a lubricant for the threaded end portion 176 of valve actuation rod 170 and threaded bore 130 of sleeve plug 128 to reduce the friction therebetween and the oil in chamber 190 also distributes the forces acting on valve actuator rod 170 such that the only axial pressure force acting on valve actuator rod 170 is applied accross an area equal to the cross-sectional area of end portion 174 of the valve actuator rod 170.

It can be easily seen from the foregoing that the valve of the present invention is easily actuated, easily cleaned and may be easily repaired by access to the various components of the valve.

Having thus described my invention, I claim:

1. A valve for controlling the flow of fluid comprising:

valve body housing means having an inlet and an outlet thereto;

sleeve assembly means retained within the valve body housing means, the sleeve assembly means comprising:

annular sliding flow sleeve means slidably retained within the valve body housing;

outlet sleeve means abutting the annular sliding flow sleeve means and slidably, sealingly engaging the interior of the valve body housing means;

seal sleeve means sealingly engaging the valve body housing means and slidably, sealingly engaging the outlet sleeve means;

sleeve plug means secured to one end of the annular sliding flow sleeve means;

sleeve cap means secured to the annular sliding flow sleeve means; and sliding piston means slidably, sealingly engaging the interior of the annular sliding flow sleeve means; and actuation assembly means secured to the valve body housing means and secured to the sleeve assembly means.

2. The valve of claim 1 wherein the actuation asssembly means comprises:

valve cap means secured to one end of the valve body housing means having a bore therethrough;

valve actuator rod means extending through the bore in the valve cap means having one end thereof secured to the sleeve assembly means; and rod cap means having a bore therein and secured to the other end of the valve actuator rod means.

3. The valve of claim 2 wherein the valve actuator rod means has one end thereof secured to the sleeve plug means of the sleeve assembly means.

4. The valve of claim 1 wherein:

the valve body housing means having longitudinal spline means along a portion of the interior surface thereof; and the sleeve cap means comprises annular member means secured to the annular sliding flow sleeve means and having longitudinal channel means in the exterior thereof slidably receiving the longitudinal spline means of the valve body housing means therein.

5. The valve of claim 1 wherein a portion of the interior of the valve body housing means receiving the sleeve assembly means therein being filled with oil.

6. The valve of claim 5 wherein the sleeve assembly further comprises:

outlet sleeve means abutting the annular sliding flow sleeve means and slidably, sealingly engaging the interior of the valve body housing means;

seal sleeve means sealingly engaging the valve body housing means and slidably, sealingly engaging the outlet sleeve means;

sleeve plug means secured to one end of the annular sliding flow sleeve means having apertures therethrough permitting communication of the oil within a portion of the valve body housing means to the interior of the interior of the annular sliding flow sleeve means and the sliding piston means therein; and sleeve cap means secured to the annular sliding flow sleeve means.

7. The valve of claim 6 wherein the actuation assembly means comprises:

valve cap means secured to one end of the valve body housing means having a bore therethrough and having removable plug means therein;

valve actuator rod means extending through the bore in the valve cap means in sealing engagement therewith having one end thereof secured to the sleeve plug means of the sleeve assembly means; and rod cap means having a bore therein and secured to the other end of the valve actuator rod means.

8. The valve of claim 1 wherein the valve body housing means comprises:

first annular member means;

second annular member means having inlet means and outlet means thereto; and outlet flow line means secured to the second annular member means.

9. The valve of claim 8 wherein the sleeve assembly further comprises:

outlet sleeve means abutting the annular sliding flow sleeve means and slidably sealingly engaging the interior of the outlet flow line means of the valve body housing means;

seal sleeve means sealingly engaging a portion of the interior of the second annular member means of the valve body housing means and slidably, sealingly engaging the outlet sleeve means;

sleeve plug means secured to one end of the annular sliding flow sleeve means having apertures therethrough; and sleeve cap means secured to the annular sliding flow sleeve means.

10. The valve of claim 9 wherein the actuation assembly means comprises:

valve cap means secured to one end of the valve body housing means having a bore therethrough and having removable plug means therein;

valve actuator rod means extending through the bore in the valve cap means in sealing engagement therewith having one end thereof secured to the sleeve plug means of the sleeve assembly means; and rod cap means having a bore therein and secured to the other end of the valve actuator rod means.

11. The valve of claim 10 wherein a portion of the interior of the valve body housing means receiving the sleeve assembly means therein being filled with oil.

12. A valve for controlling the flow of fluid comprising:

valve body housing means comprising:
first annular member means;
second annular member means having inlet means and outlet means thereto; and
outlet flow line means secured to the second annular member means;

sleeve assembly means retained within the valve body housing means, the sleeve assembly means comprising:
annular sliding flow sleeve means slidably, sealingly retained within the second annular member of the valve body housing;
sliding piston means slidably, sealingly engaging the interior of the annular sliding flow sleeve means;
outlet sleeve means abutting the annular sliding flow sleeve means and slidably, sealingly engaging the interior of the outlet flow line means of the valve body housing means;
seal sleeve means sealingly engaging a portion of the interior of the second annular member means of the valve body housing means and slidably, sealingly engaging the outlet sleeve means;
sleeve plug means secured to one end of the annular sliding flow sleeve means having apertures therethrough; and
sleeve cap means secured to the annular sliding flow sleeve means;

actuation assembly means secured to the valve body housing means and secured to the sleeve assembly means, the actuation assembly means comprising:
valve cap means secured to one end of the first annular member means of the valve body housing means having a bore therethrough and having removable plug means therein;
valve actuator rod means extending through the bore in the valve cap means in sealing engagement therein, the valve actuator rod means having one end thereof threadedly engaging the sleeve plug means of the sleeve assembly means; and rod cap means having a bore therein and threadedly secured to the other end of the valve actuator rod means; and oil means filling a portion of the interior of the first annular member means of the valve body housing means.

13. The valve of claim 12 wherein:

the first annular member means of the valve body housing means further including longitudinal spline means along a portion of the interior surface thereof; and the sleeve cap means comprises annular member means secured to the annular sliding flow sleeve means and having longitudinal channel means in the exterior thereof slidably receiving the longitudinal spline means of the valve body housing means therein.

* * * * *